United States Patent Office 3,294,838
Patented Dec. 27, 1966

3,294,838
NUCLEOPHILIC REACTIONS OF 2,3-
DINITRONAPHTHALENE
Donald C. Morrison, Kansas City, Mo., assignor to Fundamental Research Company, Berkeley, Calif., a partnership
No Drawing. Filed Sept. 23, 1963, Ser. No. 310,866
3 Claims. (Cl. 260—505)

This application for Letters Patent is a continuation-in-part of my co-pending application, Serial No. 107,649, filed May 4, 1961 and now abandoned.

This invention relates to naphthalene chemistry and is concerned particularly with certain new and useful nucleophilic reactions of 2,3-dinitronaphthalene and the products produced thereby.

The essence of the invention is my discovery that, when 2,3-dinitronaphthalene is treated with an alkaline nucleophilic reagent, that is, a reagent which is capable of donating electrons and which in aqueous solution has a pH greater than 7, under conditions as outlined hereinafter, a novel molecular rearrangement occurs. In this rearrangement the nitro group occupying the "2" position in the starting compound is replaced by a hydrogen, while the hydrogen in the "1" position is replaced by a substituent group whose nature is dependent on the alkaline reagent employed. The resulting product is, in whole or part, a 3-nitro-1-substituted naphthalene.

As a result of this invention I am enabled by simple means and in excellent yield to make a number of valuable 1,3-disubstituted naphthalene derivatives which are not otherwise available except through laborious, costly and non-commercial procedures.

The novelty of my invention is particularly striking in view of the fact that 2,3-dinitronaphthalene has been known since 1929, when its preparation was described by Chudozilov (Collection Czechoslav. 1, 302).

The starting material for my invention, 2,3-nitronaphthalene, may be prepared by any known method. I prefer, however, to use the procedure comprising essentially the dinitration and pyrolysis of the Diels-Alder adduct of two molecules of hexachlorocyclopentadiene with one molecule of naphthalene, as disclosed in U.S. Patent No. 3,085,115.

I have no certain explanation for this unique and completely unexpected conversion of 2,3-dinitronaphthalene to a 3-nitro-1-substituted naphthalene. A highly individual electronic structure of the 2,3-dinitronaphthalene may be responsible for its susceptibility to this reaction with the alkaline nucleophilic reagent. Nor do I have a proven theoretical explanation for the fact that while, in most cases, the substituent in the 1-position in the final reaction product is taken directly from the alkaline reagent, in some cases the appearance in the 1-position of a substituent from the alkaline reagent seems to be merely transitory, this substituent being in turn replaced by the final substituent, possibly as a result of reaction with the alkaline reagent or the solvent or for other reasons. In any case, however, and regardless of the mechanism involved, the combination of the basicity of the alkaline nucleophilic reagent and the particular characteristics of 2,3-dinitronaphthalene results in the novel molecular rearrangement which constitutes my discovery and which is the effect of the practice of the process of this invention.

In view of the generic nature of my invention, it is not surprising that the alkaline nucleophilic reagents which will accomplish the unique molecular rearrangement described above constitute a numerous class. In fact, to the best of my knowledge, any alkaline nucleophilic reagent, which is defined herein as one capable of donating electrons and having in aqueous solution a pH greater than 7, will accomplish this result, though the extent and degree of completeness of the reaction, as well as the yield of product and amount of by-products, will vary widely in different cases. While an alkaline reagent as defined herein is one which in aqueous solution has a pH greater than 7, it is not necessary that the reagent be employed in aqueous solution. In fact, as will be seen from the examples below, most of the reactions involved are carried out advantageously in non-aqueous solution. This is due in large part to the insolubility of 2,3-dinitronaphthalene in water, but it is apparently due also in some cases to the fact that, when an aqueous solution of the alkaline nucleophilic reagent is employed, the desired molecular rearrangement does take place, but the reaction does not stop there and goes on to the formation of polymeric and other undesired by-products.

The rate of reaction of the molecular arrangement varies considerably with different alkaline reagents and under different conditions, as will be seen from the examples given below. Thus, for example, a substantial degree of completeness may be obtained in some cases as rapidly as five minutes at room temperature, whereas in other cases as much as 48 hours at the reflux temperature of the solution may be required, for a poorer yield. In some cases also, increasing the concentration of the alkaline reagent in the treating solution, where this is feasible, not only greatly accelerates the rate of the molecular rearrangement, but also minimizes or even eliminates the formation of other substituted reaction products. This is shown strikingly in the case of the alkali metal alkoxides, such as the reaction with sodium methoxide described in Example I. Under the conditions set forth in that example, where the concentration of the sodium methoxide was about 10 percent, the reaction was substantially complete in 16 hours at 45° C., and the reaction product was pure 3-nitro-1-methoxynaphthalene, free from other isomers. When, on the other hand, the concentration of the sodium methoxide solution was about 1 percent, the desired molecular rearrangement occurred only to the extent of 30 percent of the reaction product, the remainder being the simply substituted 3-nito-2-methoxynaphthalene, and to achieve even this degree of molecular rearrangement heating at reflux temperature (65° C.) for 48 hours was required.

Among the alkaline nucleophilic reagents which I have found especially effective in performing the molecular rearrangement are the following: alkoxides, such as sodium and potassium methoxide and ethoxide in methanol and ethanol respectively; alkali metal hydroxides, such as sodium and potassium hydroxide in solution in methanol or ethanol; primary and secondary non-aromatic amines, such as ethanolamine, diethylamine, butylamine, ethylenimine, piperidine, morpholine, piperazine and pyrrolidine; aniline; hydrazine and primary substituted hydrazines; alkali metal phthalimides; and normal alkali metal sulfites. The amines and hydrazines, being liquids, act as their own solvents; but they may be diluted with appropriate other and inert liquids if desired.

Among other alkaline nucleophilic reagents which I have found to produce the 1,3-molecular rearrangement, but with considerably lower yield and/or purity of the product, probably because I have not yet determined the optimum conditions in each case for carrying out the reaction, are the following: aromatic and aliphatic alkali metal thiolates in alcoholic solution; alkali metal cyanides, nitrites, and thiocyanates in alcoholic solution or in dimethylformamide; and alkali metal hydroxides in aqueous solution.

It is not to be expected, in carrying out a reaction of as wide an applicability, from the standpoint of the scope of workability as to one of the two principal reactants, the alkaline nucleophilic reagent, that a single, specific and detailed set of operating conditions would be found optimal in all cases.

Since the solution of an alkali metal in an alcohol forms the alkali metal alkoxide, and since an alcoholic solution of an alkali metal hydroxide is an equilibrium mixture containing the alkali metal alkoxide, the first two solutions and a solution made by dissolving a previously-formed alkali metal alkoxide in alcohol are obviously equivalents from the standpoint of the basic reaction of this invention.

The examples outlined below of the manner of using my invention are given for purposes of illustration and obviously not of limitation. It will be noted in the examples that the identity of the 3-nitro-1-substituted naphthalene reaction product was established by infra-red spectroscopic analysis. The work of Hawkins, Ward, and Whiffen [Spectrochim. Acta 10, 105 (1957)] showed conclusively the utility of infra-red spectroscopy for this purpose.

*Example I.—Use of sodium methoxide*

Two hundred parts by weight of sodium methoxide were dissolved in 2000 parts of methanol, and 75 parts of 2,3-dinitronaphthalene were then added. This mixture was heated in a water bath with stirring at 45° C. for 16 hours, then cooled to room temperature and added to 4000 parts of water. This mixture was allowed to stand overnight (16 hours), after which the solids were filtered off, washed with water and dried. The yield was 66 parts of pure 3-nitro-1-methoxynaphthalene, equivalent to 94 percent of theoretical yield. The identity of the compound was established by infra-red spectroscopy.

*Example II.—Use of alcoholic KOH*

To a suspension of 5 parts by weight of 2,3-dinitronaphthalene in 100 parts of methanol was added with stirring over a period of a half hour a solution of 20 parts of potassium hydroxide in 100 parts of methanol, maintaining the reaction mixture at room temperature. The mixture was allowed to stand at room temperature for 48 hours, and was then diluted with 1000 parts of water. The solids which precipitated were filtered off, washed with water, and recrystallized from aqueous acetone. The yield was 4.1 parts of 3-nitro-1-methoxy-naphthalene, equivalent to 88 percent of theoretical. The identity of the compound was established by infra-red spectroscopy.

*Example III.—Use of n-propyl alcohol and KOH*

1.0 part by weight of 2,3-dinitronaphthalene was added to a mixture of 10 parts of potassium hydroxide and 50 parts of n-propyl alcohol. The resultant mixture was maintained at 25°–30° C. for 11 hours, then added to an excess of water. The insoluble material was filtered off and examined by infra-red spectroscopy. It was found to be 3-nitro-1-propoxy-naphthalene.

*Example IV.—Use of ethylene glycol and KOH*

2.0 parts by weight of 2,3-dinitronaphthalene in 25 parts of isopropyl alcohol were mixed with 15 parts of ethylene glycol, 1.0 part of solid potassium hydroxide, and 10 parts of water. The resultant suspension was maintained at 25° C. for 48 hours, during which time a homogeneous solution was formed. This solution was allowed to stand an additional 24 hours, then added to an excess of water. The insoluble material which resulted was filtered off and was shown by infra-red spectroscopy to be 3-nitro-1-($\beta$-hydroxyethoxy) naphthalene.

*Example V.—Use of resorcinol*

A solution of 1.15 parts by weight of sodium in 50 parts of methanol was mixed with 5.5 parts of resorcinol. To this mixture there was then added 2.0 parts of 2,3-dinitronaphthalene and the resultant mixture was heated for 1 hour at 50° C. It was then cooled and diluted with ice water, forming a clear dark brown solution. This was acidified with hydrochloric acid, giving a curdy yellow-brown precipitate which was filtered off and dried. Darkening took place on drying. The dried product weighed 2.2 parts, or 85.5 percent of the theoretical. Infra-red analysis showed the product to be 3-nitro-1-(meta-hydroxy-phenoxy) naphthalene.

*Example VI.—Use of ethanolamine*

One part by weight of powdered 2,3-dinitronaphthalene was added, with constant stirring, to 10.0 parts of ethanolamine, and the reddish-black solution heated for 30 minutes at 60° C. After cooling, 40 parts of water were added gradually, with stirring. An oil separated out, but soon crystallized. An additional 100 parts of water were added, and the solid product was filtered clear of mother liquor, washed repeatedly with cold water, and dried. The orange-colored crystalline solid was shown by infra-red spectroscopy to be 3-nitro-1-ethanolamino-naphthalene, and it was obtained in better than 80 percent yield.

*Example VIII.—Use of n-butylamine*

To 25 parts by weight of butylamine were added gradually 1.7 parts of 2,3-dinitronaphthalene. Spontaneous warming occurred and a dark red solution formed. This solution was kept 10 minutes at room temperature and then heated to 50° C. and maintained at that temperature for 5 minutes. An excess of water was then added and the mixture steam distilled until the residue had no odor. The residue was permitted to stand 2 days for crystallization to be completed and then filtered off. The yield of product was 1.58 parts by weight of 86 percent of the theoretical. Infra-red analysis gave a spectrum compatible with 3-nitro-1-butylamino-naphthalene.

*Example VIII.—Use of aniline*

10 parts by weight of 2,3-dinitronaphthalene in 250 parts of aniline were heated for 48 hours at 150±5° C., during which time all the 2,3-dinitronaphthalene was converted to ether-soluble products, evidencing that no 2,3-dinitronaphthalene remained. The resultant solution was added to an excess of aqueous hydrochloric acid and the two-phase mixture extracted with diethyl ether. Evaporation of the ether extract yielded an oily product which was shown by infra-red spectroscopy to be substantially pure 3-nitro-1-anilino-naphthalene.

*Example IX.—Use of diethylamine*

2.0 parts by weight of 2,3-dinitronaphthalene were dissolved with heating in 30 parts of diethylamine and the solution then heated at reflux temperature (55° C.) for 7 hours. On cooling, the reaction mixture separated into two layers, an upper layer consisting primarily of a diethylamine solution of crude 3-nitro-1-diethylamino-naphthalene, and a lower oily layer consisting predominantly of unreacted 2,3-dinitronaphthalene and by-products. The diethylamine layer was diluted with an excess of water, yielding a resinous solid. This solid was extracted with concentrated hydrochloric acid and the extract diluted with twice its volume of water. Upon standing for 3 hours, there was formed a yellow-brown precipitate, which was identified by infra-red spectroscopy as 3-nitro-1-diethylamino-naphthalene containing a minor amount of oxygenated impurity.

*Example X.—Use of ethylenimine*

2.0 parts by weight of 2,3-dinitronaphthalene were dissolved in 20 parts of hot toluene and then cooled to form a slurry. To this slurry was added slowly 5 parts of ethylenimine. On standing a few minutes spontaneous warming occurred and the reaction mixture became turbid. A red oily layer separated on the bottom of the toluene solution. After 4 hours water was added to remove the red layer, and the toluene layer was then left to evaporate at room temperature overnight. The residue from this evaporation consisted of yellow-orange crystals, in amount 1.35 parts by weight or 68 percent of the theoretical. Its I-R spectrum was compatible with 3-nitro-1-ethylenimino-naphthalene, or more properly named, according to the Ring Index, 3-nitro-1-(1-aziridinyl) naphthalene.

*Example XI.—Use of piperidine*

5 parts by weight of 2,3-dinitronaphthalene were added incrementally to 10 parts of piperidine, keeping the temperature below 40° C. (this reaction is exothermic) during the addition. Within 5 minutes after the addition, the reaction mixture had set to a paste. This was held 15 minutes longer and then stirred with an excess of water. This mixture was filtered, and the filtered-off solids washed with water, then crystallized from aqueous isopropyl alcohol, and finally dried. The yield of dried product was 5.3 parts by weight, eqivalent to 95 percent of theoretical, of substantially pure 3-nitro-1-piperidino-naphthalene, as determined by I-R spectrophotometric analysis. After recrystallization from methanol, the product was found to have a melting point of 116–117° C.

*Example XII.—Use of morpholine*

The procedure of the example immediately preceding was followed in all respects and details except that the 10 parts by weight of piperidine used in that example were replaced by 20 parts of morpholine. The product was 3-nitro-1-morpholino-naphthalene, as determined by I-R spectrophotometric analysis. The yield of substantially pure product was 11.8 parts, equivalent to 95 percent of theoretical. After recrystallization from aqueous acetone the melting point of the compound was found to be 144–146° C.

*Example XIII.—Use of hydrazine*

2.0 parts by weight of 2,3-dinitronaphthalene and 3.5 parts of hydrazine were heated to 50° C. The solution turned dark red. The reaction mixture was maintained at 50–60° C. for 15 minutes, then cooled and added to an equal volume of water. The resultant aqueous solution deposited on standing a red-orange precipitate which was identified by infra-red spectroscopy as 3-nitro-1-hydrazino-naphthalene, and which gave characteristic reactions of hydrazine compounds with salicylaldehyde and with nitrous acid. Further concentration of the aqueous solution gave solid deposits containing more of the 3-nitro-1-hydrazino-naphthalene.

*Example XIV.—Use of phenylhydrazine*

2.0 parts by weight of 2,3-dinitronaphthalene in 50 parts of phenylhydrazine (practical grade) were heated for 16 hours at 150±5° C. The solution was then added to an excess of water and made weakly acid with hydrochloric acid. The maroon-colored oil was separated by decantation. To the aqueous solution was added ammonium hydroxide, which produced a tan precipitate. This was identified by infra-red spectroscopy as 3-nitro-1-phenylhydrazino - naphthalene. The maroon-colored oil was extracted with ether, and the extract dried with magnesium sulfate and then evaporated. The residue from the evaporation was found by infra-red spectroscopy to consist also substantially of 3-nitro-1-phenylhydrazino-naphthalene, together with a smaller amount of its reduction products.

*Example XV.—Use of potassium phthalimide*

2.0 parts by weight of 2,3-dinitronaphthalene in 50 parts of dimethylformamide were added to 2.5 parts of potassium phthalimide. The resultant solution was refluxed at 154° C. for 4½ hours, then cooled to room temperature and added to an excess of water. A solid precipitate formed immediately. This was filtered off and identified by infra-red spectroscopy as 3-nitro-1-phthalimido-naphthalene by comparison with an authentic sample. Other alkali metal phthalimides, such as sodium phthalimide, may be utilized in place of the potassium compound.

*Example XVI.—Use of normal alkali metal sulfites: sodium sulfite*

12 parts by weight of anhydrous sodium sulfite and 10 parts of 2,3-dinitronaphthalene were added to 100 parts of water and stirred. The mixture was refluxed for 1½ hours and then cooled. The reaction mixture was then filtered to remove any insoluble by-product or unreacted starting material, and the filtrate saturated with sodium chloride to salt out the reaction product. The precipitate was filtered off, washed with saturated sodium chloride brine, redissolved in 200 parts of water, and salted out again from the filtrate by saturation with sodium chloride. The precipitate was filtered off, washed with brine, and dried. The reaction product was shown by infra-red spectrophotometric examination to be the very pure sodium salt of 3-nitro-1-naphthalene sulfonic acid, free from isomeric compounds.

*Example XVII.—Use of normal alkali metal sulfites: potassium sulfite*

This reaction was carried out using the same procedure described in Example XVI except that the 12 parts by weight of anhydrous sodium sulfite employed in Example XVI were replaced with an equivalent weight (15 parts) of anhydrous potassium sulfite. The refluxed and cooled reaction mixture was filtered, as before, and the filtrate substantially saturated with potassium chloride. The insoluble salt which precipitated was filtered off and dried. The reaction product was shown by infra-red spectrophotometric analysis to be the potassium salt of 3-nitro-1-naphthalene sulfonic acid.

Normal ammonium sulfite may also be used instead of the sodium or potassium sulfite shown above, with the production of the ammonium salt of 3-nitro-1-naphthalene sulfonic acid, but its use is not preferred, due primarily to its tendency to decompose and volatilize at the reaction temperature employed.

The importance of alkalinity in effecting the novel molecular rearrangement of my discovery may be demonstrated very strikingly in the case of the sulfites. In the case of Example XVI above, the initial pH of the normal sodium sulfite solution was 9.1 and, at the end of the reaction, 10.6. The final reaction product, as previously noted, was the very pure sodium salt of 3-nitro-1-naphthalene sulfonic acid.

If, on the other hand, an aqueous solution of sodium bisulfite ($NaHSO_3$) is employed, having, for example, an initial pH of 3.6, no molecular rearrangement occurs. Instead, an $SO_3Na$ group enter into the 2-position, and the nitro group in the 3-position is reduced to the amino group. On acidification with HCl, the final reaction product is exclusively 3-amino-2-naphthalene sulfonic acid.

The basic reaction of my invention provides a simple and economical method for preparing many compounds of great utility in industry and the arts. Thus, for example, 3-nitro-1-methoxy-naphthalene is a biochemical reagent which has recently achieved considerable importance. Again, 3-nitro-1-naphthalene sulfonic acid is an intermediate in the production of 3-amino- and 3-hydroxy-1-naphthalene-sulfonic acids, which are novel and valuable intermediates in the production of azo dyes and pigments, and which in turn on fusion yield naphthoresorcinol, a valuable and important biological and analytical reagent, which has also been used in the dyestuff industry. 3-nitro-1-morpholinonaphthalene shows considerable promise in the preparation of valuable pharmaceutical chemicals, as do 3-nitro-1-aziridinylnaphthalene and 3-nitro-1-piperidino-naphthalene.

The foregoing written description of my invention and the variety and number of the examples set forth demonstrate the basic scope of the molecular rearrangement process of my invention and the great number of products which may therefore be produced by its utilization. In this situation it is inevitable that many modifications in the practicing incidentals of the process, such as time and temperature of reaction, concentration of reactants, choice of reagents and solvents, and other such matters of choice and routine, as well as in the range and variety of products derivable from the practice of the subject molecular rearrangement process, will suggest themselves to those skilled in the arts or arts to which the subject discovery or invention pertains. There are only two essentials to the practice of my discovery or invention: (1) the employment of but one molecularly rearrangeable material, 2,3-dinitronaphthalene; and (2) the employment with that material of any reagent having the capability of acting as an electron donor and having a pH, when in aqueous solution, of not less than 7, i.e., "an alkaline nucleophilic reagent."

What I claim as new, useful and unobvious to a person having ordinary skill in the art to which my discovery or invention pertains, and which I therefore desire to secure by Letters Patent is:

1. A process for producing from 2,3-dinitronaphthalene reaction product material comprising 3-nitro-1-substituted naphthalene, said process comprising reacting 2,3-dinitronaphthalene with an alkaline nucleophilic reagent in a solution at a temperature with the range of from about room temperature to the reflux temperature of said solution for a period of time within the range of from about 5 minutes to about 48 hours, said alkaline nucleophilic reagent being sodium methoxide in methanol.

2. A process for producing from 2,3-dinitronaphthalene reaction product material comprising 3-nitro-1-substituted naphthalene, said process comprising reacting 2,3-dinitronaphthalene with an alkaline nucleophilic reagent in a solution at a temperature within the range of from about room temperature to the reflux temperature of said solution for a period of time within the range of from about 5 minutes to about 48 hours, said reagent being normal sodium sulfite in aqueous solution.

3. A process for producing from 2,3-dinitronaphthalene reaction product material comprising 3-nitro-1-substituted naphthalene, said process comprising reacting 2,3-dinitronaphthalene with an alkaline nucleophilic reagent in a solution at a temperature with the range of from about room temperature to the reflux temperature of said solution for a period of time within the range of from about 5 minutes to about 48 hours, said reagent being ethanolamine.

References Cited by the Examiner

Ward et al.: J. Chem. Soc., 1954, p. 2974.

Morrison: J. Org. Chem., vol. 27, January 1962, pp. 296–297.

Van Raj et al.: Rec. Trav. Chem., vol. 70, 1951, pp. 236–240.

LEON ZITVER, *Primary Examiner.*

LORRAINE A. WEINBERGER, *Examiner.*

B. M. EISEN, B. HELFIN, *Assistant Examiners.*